United States Patent [19]

Russell

[11] Patent Number: 5,276,282
[45] Date of Patent: Jan. 4, 1994

[54] OPTIMAL SCAN SEQUENCE FOR RF MAGNETIC DIGITIZERS

[75] Inventor: Gregory F. Russell, Yorktown Heights, N.Y.

[73] Assignee: International Business Machines, Armonk, N.Y.

[21] Appl. No.: 869,564

[22] Filed: Apr. 15, 1992

[51] Int. Cl.$^5$ ............................................. G08C 21/00
[52] U.S. Cl. ..................................................... 178/19
[58] Field of Search ..................... 178/18, 19; 340/706; 364/709.14, 709.01, 710.01

[56] References Cited

U.S. PATENT DOCUMENTS

| | | | |
|---|---|---|---|
| 4,088,842 | 5/1978 | Ikedo | 178/19 |
| 4,423,286 | 12/1983 | Bergeron | 178/19 |
| 4,471,162 | 9/1984 | Aono et al. | 178/19 |
| 4,477,877 | 10/1984 | Nakamura et al. | 364/571 |
| 4,554,409 | 11/1985 | Mitsui et al. | 178/19 |
| 4,582,955 | 4/1986 | Blesser | 178/19 |
| 4,616,106 | 10/1986 | Fowler et al. | 178/18 |
| 4,694,124 | 9/1987 | Blesser | 178/19 |
| 4,734,546 | 3/1988 | Landmeier | 178/19 |
| 4,848,496 | 7/1989 | Murakami et al. | 178/19 |
| 5,120,907 | 6/1992 | Shinbori et al. | 178/18 |

Primary Examiner—Stephen Chin
Assistant Examiner—Paul Loomis
Attorney, Agent, or Firm—Perman & Green

[57] ABSTRACT

A sensor grid system (10), and a method of operating a sensor grid system, having a first array of inductors (14a) and a second array of inductors (14b). The first and the second arrays are each responsive to a moveable coil (18) that transmits an electromagnetic signal for having a detectable signal induced therein. The method includes a first step of determining an expected position of the coil relative to an array of inductors. A next step selects a pair of inductors that are located near to the expected position. A third step measures the signals induced into the pair of inductors, and a fourth step, based on the measurement step, determines any additional inductors from which measurements are required to interpolate the actual position of the coil. A fifth step measures the signals induced into the determined ones of the additional inductors, and a sixth step computes and reports the actual position of the coil based on the results of the first and the second steps of measuring.

29 Claims, 9 Drawing Sheets

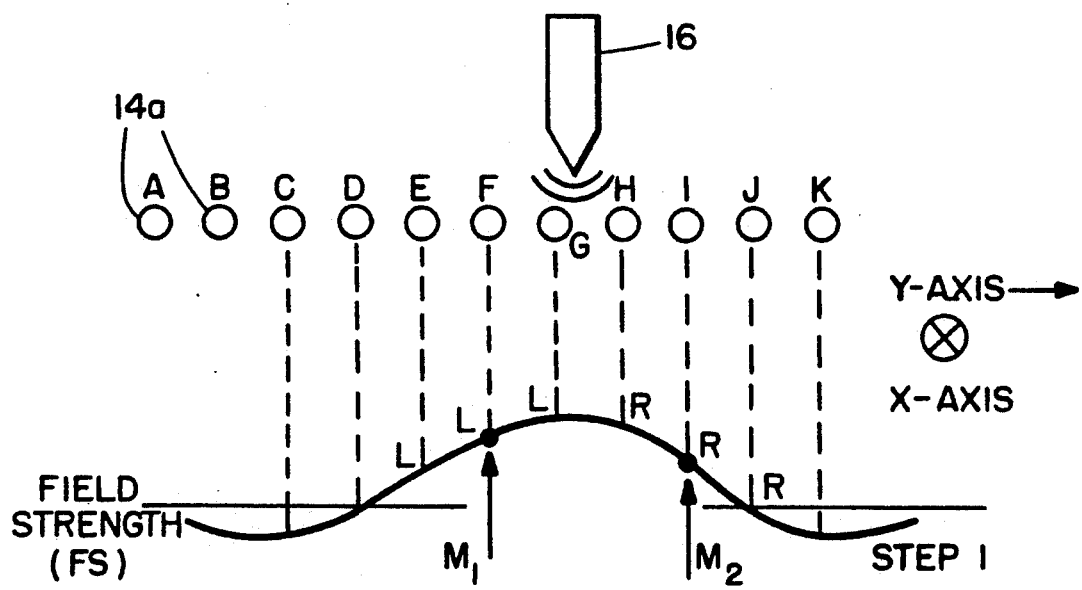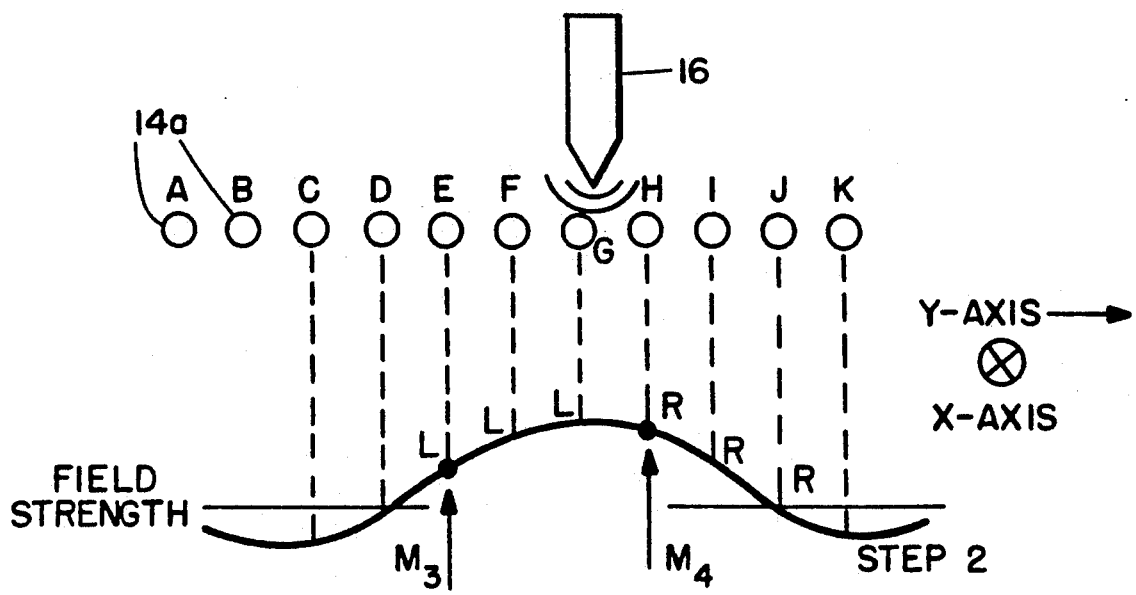

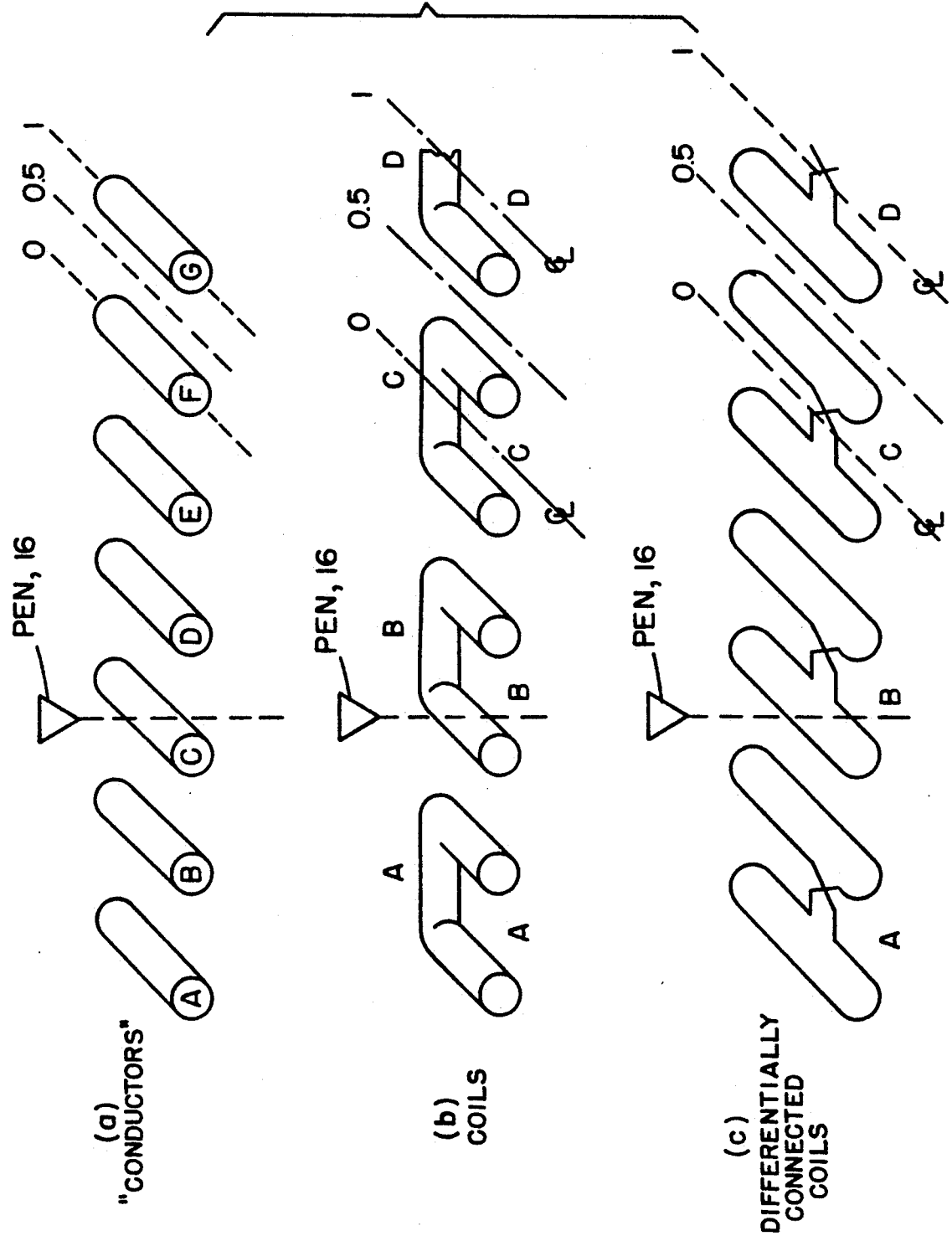

X-AXIS

14a

Y-AXIS

14b

DIFFERENTIALLY
CONNECTED
COIL PAIR

TO X-MUX 26

FIG. 9.
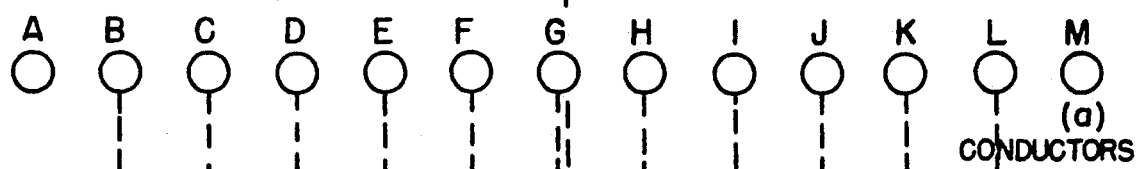
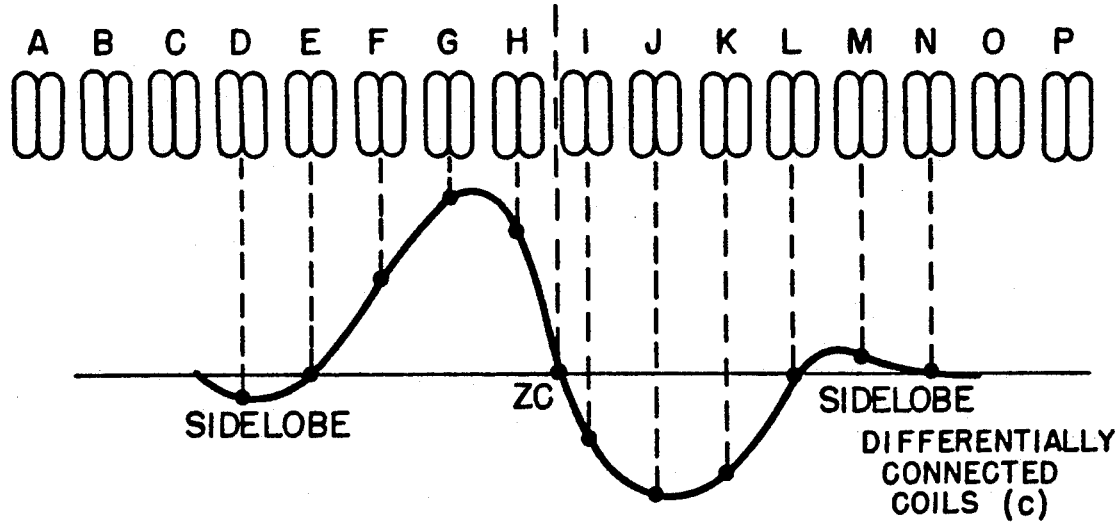

OPTIMAL SCAN SEQUENCE FOR RF MAGNETIC DIGITIZERS

FIELD OF THE INVENTION

This invention relates generally to digitizer tablet systems and, in particular, to methods for scanning an array of field sensing elements.

BACKGROUND OF THE INVENTION

A number of types of electromagnetic (EM) digitizers or digitizer tablets are known in the art. In general, a digitizer tablet provides an indication of a position of a puck, pen, or stylus with respect to a surface of a planar sensor grid. One type of digitizer tablet operates by sensing a magnetic field and includes two sets of array conductors, with one set being orthogonally oriented to the other set. In this type of system the pen is driven with an AC signal to cause an oscillating magnetic field which, in turn, induces signals in the array conductors. The signals in the array conductors are sensed and compared so as to determine the position of the pen in two dimensions, relative to the surface of the tablet.

Many digitizers utilize a single measurement channel to measure several loops or lines, from which measurements of the position of the pen may be interpolated. The interpolation algorithms are generally optimal for a specific set of loop measurements, relative to the position of the pen.

However, conventional digitizers generally either scan more loops than actually required, discarding the unneeded measurements, or scan loops expected to give the best results, and accept degraded performance when the pen is not in the expected position.

In U.S. Pat. No. 4,423,286, entitled "Apparatus and Method for Determining the Position of a Driven Coil Within a Grid of Spaced Conductors", Bergerson describes a scanning technique wherein a center conductor in the X direction is first scanned. By determining whether the polarity of a signal induced by a transmitting coil is positive or negative, it is determined in what half-section of the grid the transmitting coil is located. Next a center conductor in the determined half-section is scanned, then a center conductor in a determined quarter-section, etc., until the transmitting coil is located between two adjacent conductors. The exact coil position is determined by forming a ratio of the signal in the two adjacent conductors and comparing the ratio with values stored in a look-up table. A like set of measurements is then obtained for the conductors of the Y direction. As a result, a significant number of conductors must be scanned in each axis before the two adjacent conductors are located and before the exact coil determination technique can be employed. Furthermore, this approach is only applicable to scanning single conductors, wherein the induced signal, on one side of the pen, is guaranteed to be negative, and on the other side is guaranteed to be positive.

It is thus an object of the invention to provide methods for scanning sensing elements of a digitizing tablet so as measure a minimum number of sensing elements that are required to obtain an accurate interpolation or computation of a position of a field generating device.

It is another object of the invention to provide a method for scanning the inductors of an EM tablet so as measure only those inductors that are closest to a position of a transmitting coil and which are required to obtain an accurate interpolation of the position of the coil relative to the tablet.

SUMMARY OF THE INVENTION

The foregoing and other problems are overcome and the objects of the invention are realized by a method of scanning an array of sensing elements, such as inductors, to achieve optimal performance from a technique that interpolates an actual position of a transmitting device relative to the array of sensing elements. The method operates to measure only those inductors that are required for an optimal calculation of the position of a moveable field generating device. As a result, fewer inductors are scanned than are scanned in conventional systems, resulting in a savings in time while reducing the processing load. In general, unnecessary measurements are avoided.

When the field generating device is in motion, relative to the tablet, the choice of which inductors to measure is accomplished dynamically, in a manner that maximizes a likelihood of obtaining the correct measurements within the time allotted for scanning the inductors.

More specifically, there is provided a method of operating a digitizer system of a type having an array of inductors that are responsive to a position of a moveable field generating device. The digitizer system further includes measurement circuitry for measuring a signal induced into any one of the inductors by the field generating device, and a controller for controlling selection of inductors for measurement. The controller is also operable to determine, by computation or interpolation, an actual position of the field generating device, the determination being made based on measurements made of a plurality of the inductors.

The method includes a first step of determining an expected position of the field generating device relative to the array of inductors. This may be accomplished by tracking the device based on prior interpolations of device position or by initially scanning all inductors to coarsely locate the position of the device, relative to the array. A next step selects a pair of inductors that are located near to the expected position such that a signal induced into one of the inductors, due to a difference between an actual position of the field generating device and the expected position, will be greater than or less than a signal induced into the other one of the inductors. A third step measures the signals induced into the inductors of the pair of inductors, and a fourth step determines any additional inductors from which measurements are required to compute the actual position of the field generating device. A fifth step measures the signals induced into the determined ones of the additional inductors, and a sixth step determines and reports the actual position of the field generating device, based on the results of the first and the second steps of measuring.

In accordance with the invention the pair of inductors and the additional inductors include all inductors that are required to compute the actual position of the field generating device, and includes no inductors that are not required to compute the actual position of the field generating device.

In a further embodiment of the method of the invention, referred to herein as a "coordinate threaded" measurement technique, inductor selection and measurement steps for each of two inductor arrays alternate with one another. This latter approach is especially useful for systems wherein a result of a measurement is not immediately available for use after the measurement is made.

A further method measures a first inductor or inductors and, before the result of the first measurement is available for use, selects and measures at least one additional inductor that is known must be measured, regardless of the outcome of the first measurement.

The method of the invention is useful for sensor grids constructed of arrays of loops, coils, interconnected pairs of coils, and differentially connected pairs of coils.

For a sensor grid comprised of differentially connected pairs of coils, a method operates as follows. A first step determines an expected position of a transmitting coil relative to a first one of the arrays of conductors. A second step selects a first differentially connected coil pair from the first array, the first differentially connected coil pair being selected to encompass the expected position. A third step measures the signal induced within the first differentially connected coil pair, and a fourth step determines a polarity of the measured signal to be positive or negative. Based on an outcome of the step of determining, a further step selects a second differentially connected coil pair to make a further measurement.

BRIEF DESCRIPTION OF THE DRAWING

The above set forth and other features of the invention are made more apparent in the ensuing Detailed Description of the Invention when read in conjunction with the attached Drawing, wherein:

FIG. 1b is a block diagram that illustrates in greater detail a portion of the digitizer tablet of FIG. 1a;

FIG. 2a depicts a first measurement sequence for a pen positioned at a location above an array of EM tablet coils of a type shown in FIG. 1b;

FIG. 2b depicts a second measurement sequence for the pen positioned as in FIG. 2a;

FIG. 3 illustrates three sensor grid inductor configurations, specifically a plurality of conductors (a); a plurality of coils (b); and a plurality of differentially connected coils (c);

FIG. 9 illustrates in greater detail the three sensor grid inductor configurations of FIG. 3, and also shows the waveforms induced into the inductors due to the proximity of the pen.

DETAILED DESCRIPTION OF THE INVENTION

Figure 1A:
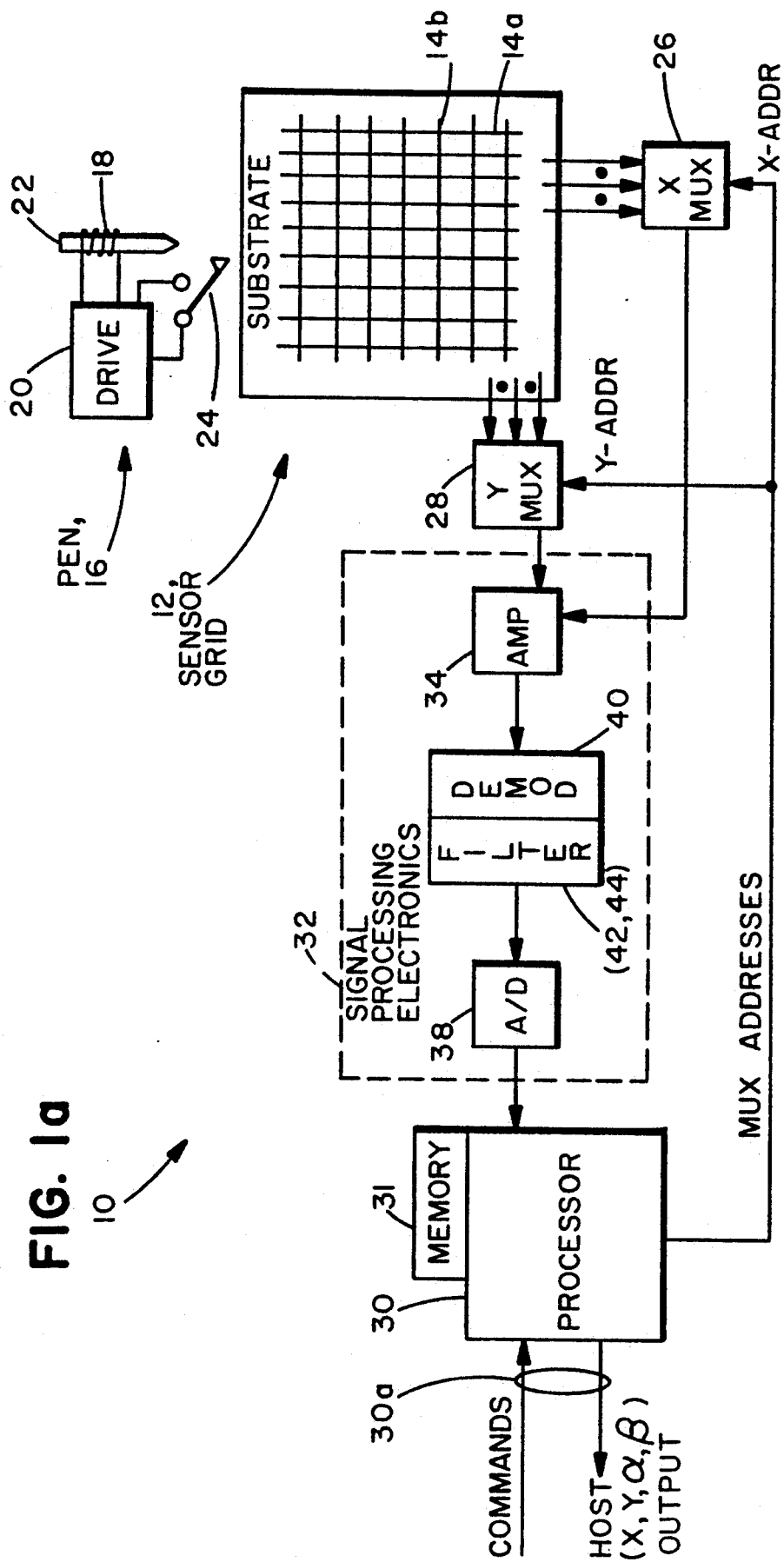
FIG. 1a is a block diagram of an embodiment of a digitizer tablet that embodies the teaching of the invention.
Figure 1B:
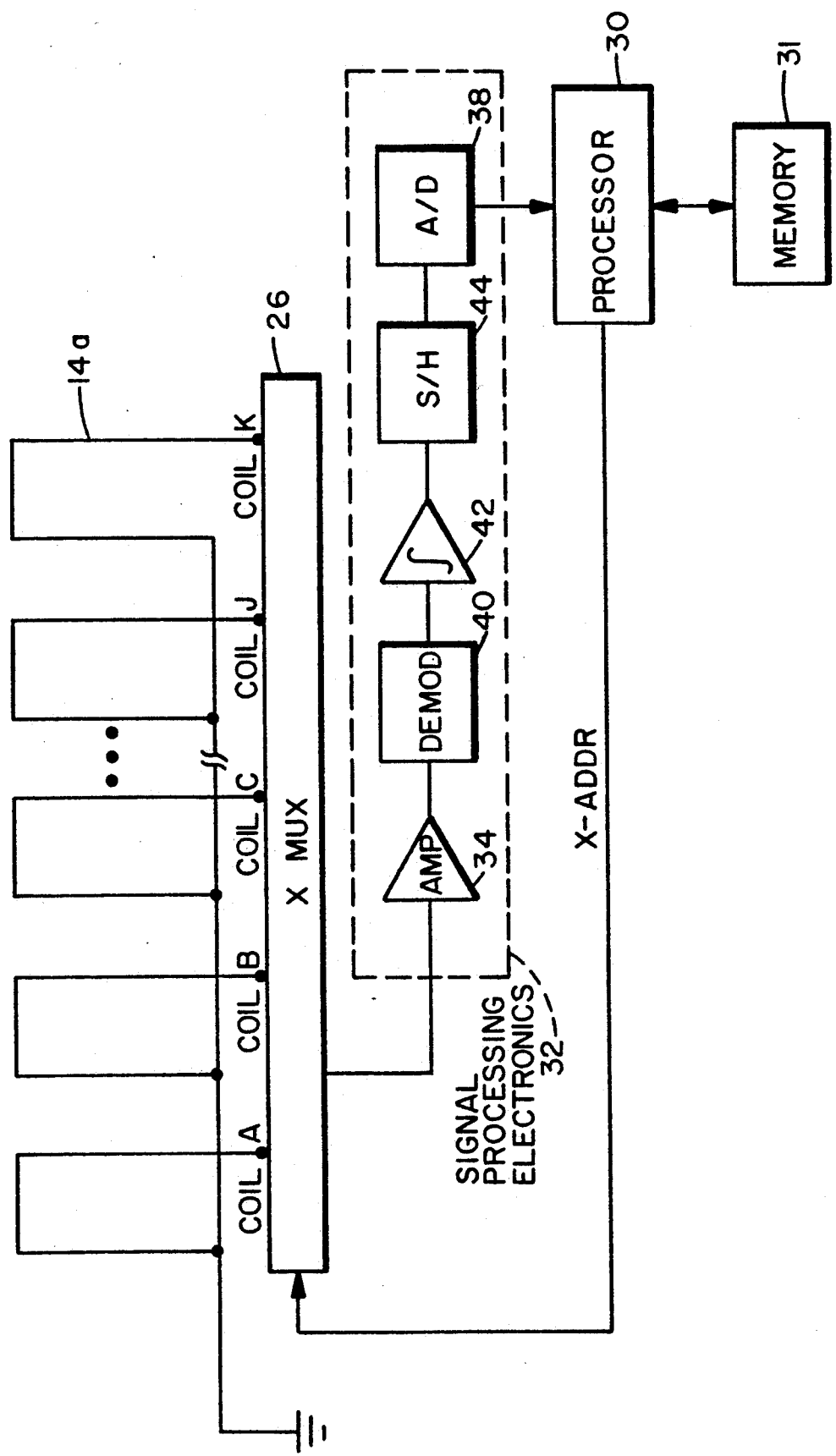

Referring to FIGS. 1a and 1b there is shown in block diagram form a digitizer tablet 10. Tablet 10 includes a sensor grid 12 comprised of two superimposed arrays of sensing elements, specifically an x-axis array 14a and a y-axis array 14b. In this embodiment each of the sensing elements includes an inductor. The inductors of one array are typically disposed in an orthogonal manner relative to the inductors of the other array.

As employed herein the term "inductor" is intended to encompass an inductive loop or coil, or a single conductor arranged in a pattern of loops or coils. The loops may be regular in shape or irregular in shape. Multiple inductors may be comprised of a single wire or conductor, wherein measurement of a signal from one of the inductors is made by measuring a signal induced across or around a particular closed path defining that inductor. The term inductor, in one embodiment of the invention, encompasses a pair of loops or coils that are differentially connected to one another. The inductors may be adjacent to one another in a same plane, or two or more inductors, or the loops composing two inductors, may overlap one another. The inductors may be formed by a discrete conductor of circular cross-section that is comprised of copper or the like, or as, by example, a conductive trace that is printed or otherwise formed upon a surface of a substrate.

Also as employed herein, a coil is defined to be a conductor forming a plurality of loops that enclose substantially the same area.

During use, a field generating device contained within a stylus, puck, or a pen 16, generates an electromagnetic signal that induces a signal into the inductors of the arrays 14a and 14b, the signal being sensed to determine a position of the pen 16 relative to the sensor grid 12. The pen 16 includes an inductive coil 18 and a coil drive circuit 20. Coil 18 is typically wrapped around a ferrite core 22. A contact switch 24 is normally employed for indicating when the tip of the pen 16 contacts an upper surface of the sensor grid 12.

By example, the inductors of the sensor grid 12 are provided as a plurality of adjacently disposed coils, with each coil having an inductance within a range of approximately 0.1 to approximately 1.0 microhenries, for a coil that is one centimeter in width and approximately 20 centimeters in length. A typical number of coils for each of the arrays 14a and 14b is twenty. Also by example, the inductance of the pen coil 18 is within a range of approximately 100 microhenries to approximately 200 microhenries. The drive circuit 20 drives the pen coil 18 with a frequency of approximately 500 KHz. The pen coil 18 is inductively coupled to the inductors of the sensor grid 12.

Tablet 10 further includes an x-axis multiplexer 26 and a y-axis multiplexer 28 that are coupled to the coils of the x-axis sensor array 14a and the y-axis sensor array 14b, respectively. A particular y-axis coil is selected to be read out by means of a Y address signal (YADDR), and a particular x-axis coil is selected by means of an X address signal (XADDR), both of which are generated by a processor 30. The signal outputs from the selected y-axis coil and the selected x-axis coil are provided to a signal processing electronics block 32. Block 32 includes an amplifier 34 having an output that is supplied to an analog-to-digital (A/D) converter 38, via a demodulator 40 and a filter that includes an integrator 42 and a sample and hold (S/H) 44. The A/D converter 38 converts the magnitude and polarity of the analog signal to a digital format for inputting to the processor 30.

As is seen more clearly in FIG. 1b, the output of the amplifier 34 feeds the demodulator 40, which in turn feeds the integrator 42 and the S/H 44. The S/H 44 enables one coil measurement to be held for digitizing by the A/D 38 while a second, subsequent coil measurement is initiated within the preceding circuitry. For the illustrated embodiment there are 11 x-axis coils (A-J) that have one end coupled in common to circuit ground. A particular one of the coils (A-J) is selected by the X-MUX 26 to be coupled to the input of the filter 32 and the amplifier 34. In other embodiments of the invention more or less than 11 coils can be employed.

The processor 30 is connected, by example, to an external host by a communication line 30a, such as a conventional RS-232C serial communication line, and receives commands and set up information from the host (FIG. 1a). In other embodiments of the invention the sensor grid 12 and the other components of FIG. 1 are an integral part of a portable, battery powered data processor wherein the sensor grid 12 and the pen 16 provide a user interface to a handwriting recognition system. For this latter embodiment the processor 30 may be connected to other components of the data processor through a general purpose or a special purpose bus.

The processor 30 includes a memory 31 for storing temporary data and coil measurements, and also for storing programs, including programs that execute a pen position estimation and the optimal coil scanning method of the invention. During operation the processor 30 outputs packets of information relating to the position and, if required, angular orientation of the pen 16 relative to the sensor grid 12. This information includes x-axis and y-axis pen position information, and may also include tilt information (alpha and beta) regarding the orientation of the pen 16 relative to a sensor grid 12 x-y coordinate system. Typical operating speeds enable approximately 100 to approximately 300 position measurements to be made per second.

FIG. 3 illustrates three sensor grid inductor configurations, specifically a plurality of conductors (a); a plurality of coils (b); and a plurality of differentially connected coils (c). FIG. 3 is intended to be viewed in conjunction with FIG. 9, which graphically depicts the signal waveforms induced into the plurality of conductors (a); the plurality of coils (b); and the plurality of differentially connected coils (c), due to the proximity of the transmitting coil 18 within the pen 16.

The "conductor" arrangement of FIGS. 3(a) and 9(a) implies a distant return path and, thus, it should be realized that each "conductor" is actually part of a larger loop. This configuration is similar to the arrangement in the aforementioned U.S. Pat. No. 4,423,286. As can be seen in FIG. 9(a), the conductors located on one side of the pen have a negative signal induced therein, and conductors on the opposite side of the pen have a positive signal induced therein. A zero-crossing (ZC) point is an intersection of an axis of the pen with a plane that contains the inductors.

FIGS. 3(b) and 9(b) illustrate the case for a coil geometry of a type shown in FIG. 1b. As can be seen, the induced signal on each side of the pen 16 includes sidelobes having a polarity that is opposite that of the main part of the induced signal near the pen. A maximum induced signal is approximately coincident with the pen position.

Figure 4A:
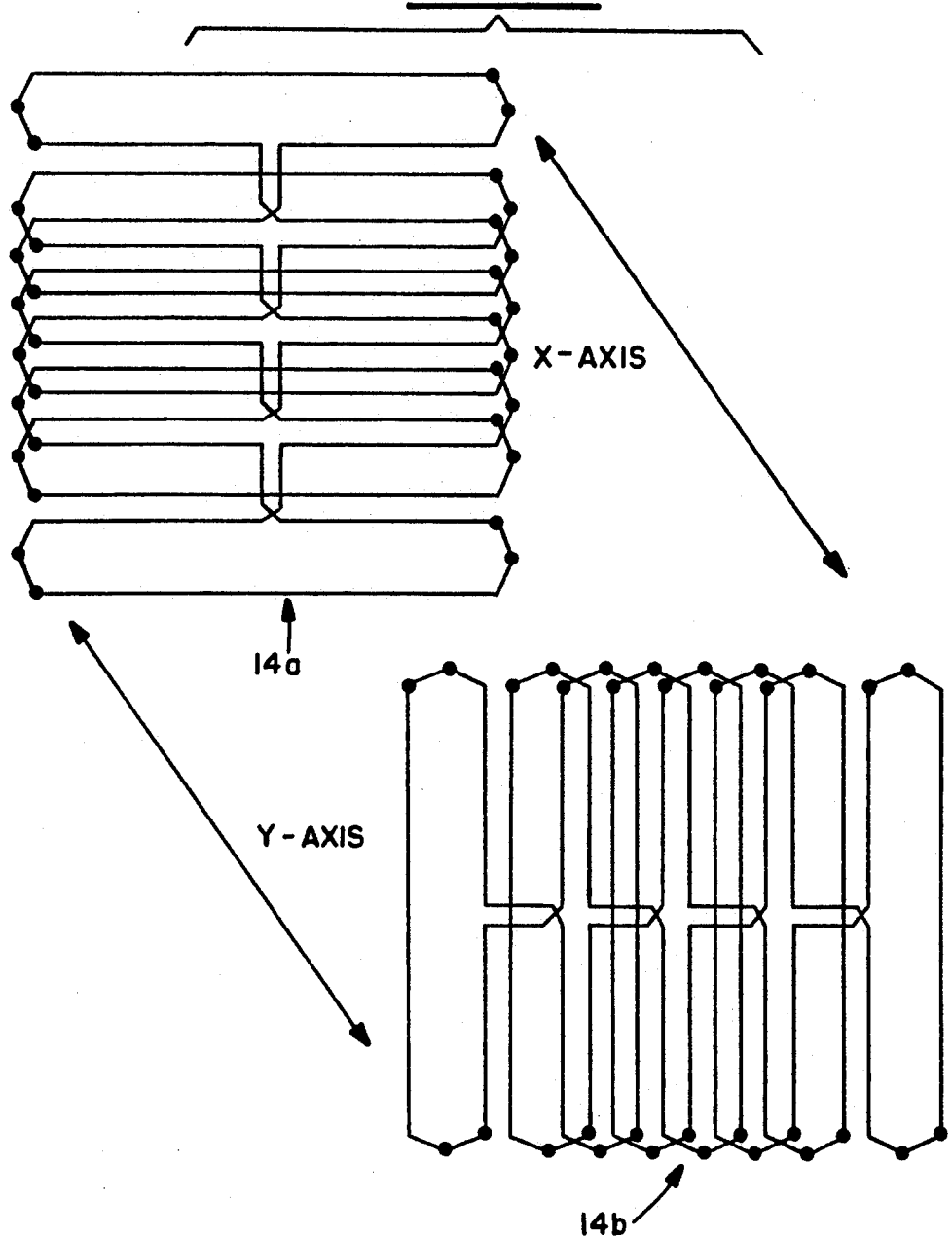
FIG. 4a illustrates overlapping, differentially connected coil pairs for an x-axis and a y-axis sensor array.
Figure 4B:
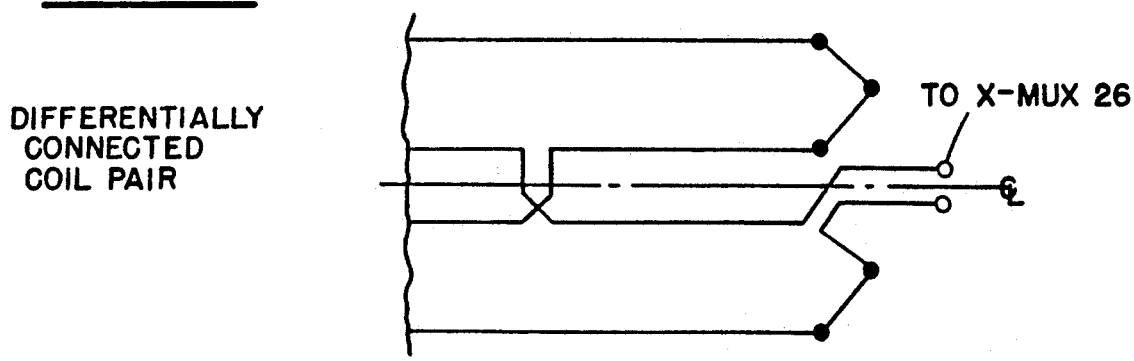
FIG. 4b shows one of the differentially connected coil pairs of FIG. 4a and shows a connection of the coil pair to a readout device.

FIGS. 3(c) and 9(c) illustrate the case for a coil geometry of a type shown in FIGS. 4a and 4b. As can be seen, the coil pairs located one side of the pen have a positive signal induced therein and coil pairs on the opposite side of the pen have a negative signal induced therein. The induced signal on each side of the pen 16 also includes sidelobes having a polarity that is opposite that of the main part of the induced signal on that side of the pen. The zero-crossing of the induced signal is approximately coincident with the pen position.

The construction and use of such differentially connected coil pairs is described in commonly assigned U S. patent application Ser. No. 07/696,434, filed May 6, 1991, entitled "Sensor Grid for an Electromagnetic Digitizer Tablet", by Gregory F. Russell, now U.S. Pat. No. 5,136,125, issued Aug. 4, 1992. The teaching of the invention also applies to pairs of coils that may be coupled together in a differential fashion by circuitry that is external to the array of coils.

In FIG. 9, it should be apparent that as the pen 16 is moved over the underlying inductors, that the signal waveform will shift with the pen. As a result, different inductors will sense different portions of the characteristic signal waveform at different times, as a function of pen position. It should also be realized that the shape and amplitude of the sidelobes is highly variable, and is strongly influenced by pen tilt. Pen tilt is considered to be an angular offset of the pen 16 away from a normal to the surface of the underlying tablet that contains the inductors.

Three distinct embodiments of measurement determination techniques are encompassed by the invention. These three embodiments employ an array of adjacent sensing elements, such as inductors, designated A, B, C, D, E, and F.

A first embodiment is referred to as a three line technique wherein inductors B and C are measured and, based on this measurement, inductor A or D is measured.

A second embodiment is referred to as a four line technique wherein inductors B and E are measured and, based on this measurement, inductors (A, D) or (C, F) are measured. Or, (B, D) are measured and, based on this measurement, inductors (A, C) or (C, E) are measured.

A third embodiment is referred to as a two line differential technique wherein an inductor B is measured and, based on the polarity of the measured signal, either inductor A or C is measured.

This latter embodiment is applicable to cases shown in FIG. 3(a) and FIG. 3(c), whereas the first two embodiments are applicable to the case shown in FIG. 3(b).

A presently preferred method of scanning the coils of the sensor grid 12 is now described with reference to FIGS. 2a, 2b, and the flowchart of FIG. 5.

In accordance with the invention, instead of scanning a predetermined set of coils, such as seven or more adjacent coils, performance is improved by first measuring a single pair of coils that are disposed near to, and which straddle, an expected position of the pen 16. That is, one of the selected coils is located on one side of the expected position and the other one of the selected coils is located on an opposite side of the expected position. Next, based on the value(s) of this first measurement, a determination is made of which additional coils are to be measured to complete the measurement cycle so as to obtain a minimum required number of measurements from which to interpolate the actual position of the pen 16, relative to the array of inductors.

In accordance with the invention the method operates to determine a set of inductors that includes all inductors that are required to compute or interpolate the actual position of the pen 16, and includes no inductors that are not required to compute or interpolate the actual position of the pen 16.

For the four line pen position determination method that is illustrated in FIGS. 2a and 2b the sensor grid 12 includes a plurality of individual coils as in FIGS. 1b, 3(b), and 9(b), and two of the x-axis coils 14a are sequentially measured or scanned during each portion of the measurement cycle. The field strength (FS) induced by the pen 16 into the underlying coils can be seen to be generally Laplacian in shape and to have a maximum amplitude that coincides closely with the actual position of the pen 16. For the illustrated example, the pen 16 is expected, based on previous measurements, to be between the coils designated as G and H. This expected position is based upon a previous determination of pen 16 position (Block A, FIG. 5) or, if the user has just begun operation with the sensor grid 12 and the pen 16, by a first step of scanning all of the coils of the x-axis array 14a and the y-axis array 14b to make an initial determination of pen 16 position, relative to the sensor grid 12 (Block B, FIG. 5).

The scan sequence is adapted to a position estimation method which requires measurement of four coils near, but not necessarily including, the coil closest to the pen position.

The first step measures the signals from the coils F and I in succession as Measurement 1 ($M_1$) and Measurement 2 ($M_2$). That is, the first step measures two coils that are disposed on opposite sides of, or straddle, the expected position of the pen and that are separated from the expected position, (Block C, FIG. 5). Specifically, one measurement is made to the left (L) of the expected pen position, and one measurement is made to the right (R) of the expected pen position, it being realized that the terms "left" and "right" are used for illustrative purposes only. By example, if the sensor grid 12 is oriented vertically then one measurement may be made from a coil that is "above" the estimated pen position and one measurement may be made from a coil that is "below" the estimated pen position.

Figure 5:
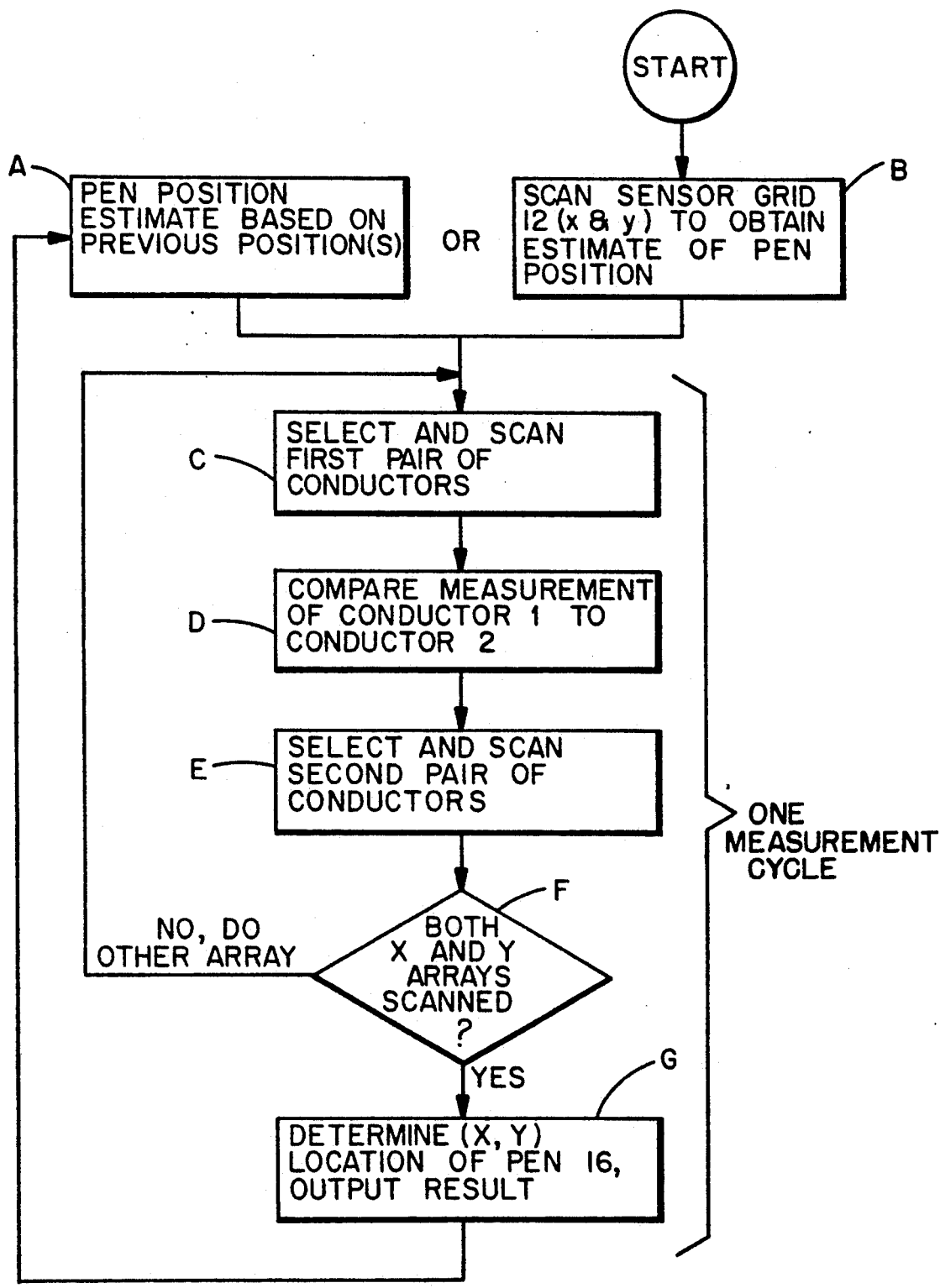
FIG. 5 is a flowchart illustrating the method depicted in FIGS. 2a and 2b.

Having completed the first measurement step, a comparison is made between the magnitude of FS for the left coil, or coil F for this example, and the magnitude of FS for the right coil, or coil I for this example (Block D, FIG. 5). This comparison provides additional information about the position of the pen, which is used to select the remaining coils to measure (Block E, FIG. 5).

In accordance with the example of FIG. 2a:

if $FS_F > FS_I$, then the pen is slightly to the Left, so next scan coils E and H in the Left direction, else if $FS_F < FS_I$, then the pen is slightly to the Right, so next scan coils G and J in the Right direction.

For the example of FIG. 2a the pen 16 is nearer to coil F than to coil I and, thus, the FS measured for coil F is greater than the FS measured for coil I. As a result, the coils E and H are selected and sequentially measured during measurement step 2 to complete the measurement cycle for the x-axis array 14a. At the completion of the measurement cycle for the x-axis array 14a the processor 30 has a minimum required number of measurements (the FS for coils E, F, H, and I) from which to interpolate the actual position of the pen 16 along the x-axis of the sensor grid 12.

The measurement cycle of FIGS. 2a and 2b is then repeated for the y-axis array 14b (Block F, FIG. 5). At the completion of the y-axis measurement cycle, the processor 30 is enabled to determine an estimated (x,y) position of the pen 16 relative to the coordinates of the sensor grid 12, and to output the result (Block G, FIG. 5).

For the differentially connected coil pair embodiment of FIGS. 3(c) and 9(c), and in accordance with the two line pen position determination method, the FS induced by the pen 16 into the underlying coils can be seen to go from positive values to negative values and to pass through zero near the actual pen position. For the illustrated example, the pen 16 is expected to be near the differentially connected coil pair designated as I (FIG. 9(c)). This expected position is based upon a previous determination of pen 16 position or, if operator has just begun operation with the sensor grid 12 and the pen 16, by the first step of scanning all of the differentially coil pairs of the x-axis array 14a and the y-axis array 14b to make an initial determination of pen 16 position, relative to the sensor grid 12.

The first measurement step measures the signal from the coil pair I that is, from the coil pair whose center is nearest to the expected position of the pen.

Having made the first measurement, the polarity of the measurement of differentially connected coil pair I is examined. Based on this examination, a next coil pair is selected for measurement. In accordance with the example of FIG. 9(c) and the two line differential determination technique referred to above:

if $FS_I > 0$, (positive polarity) then next scan coil pair J, else if $FS_I < 0$, (negative polarity) then next scan coil pair H.

At the completion of the measurement cycle, the processor 30 has two measurements from which to interpolate the zero crossing point and the position of the pen 16 along the x-axis of the sensor grid 12.

If $FS_I = 0$ it is known that the pen 16 is positioned over the centerline of the differentially connected coil pair, and a further measurement along this axis is not required.

The measurement cycle is then repeated for the y-axis array 14b. At the completion of the y-axis measurement cycle, the processor 30 is enabled to determine an estimated (x,y) position of the pen 16 relative to the coordinates of the sensor grid 12.

If the pen 16 is known to be in motion, as determined from previous position estimates, the determination of the expected position of the pen 16 may incorporate this information to estimate the position of the pen that is expected at the midpoint in time of the first measurement. This expected position is based on a rate of change of pen position and on a determined direction of pen motion. The coil pair nearest the expected position is measured first. If the gradient is negative, then a measurement is made of a previous coil pair, which should have a gradient greater than the first. If instead the first gradient is positive, then a measurement is made of a next coil pair (to the right), which should have a gradient less than the first.

Figure 8:
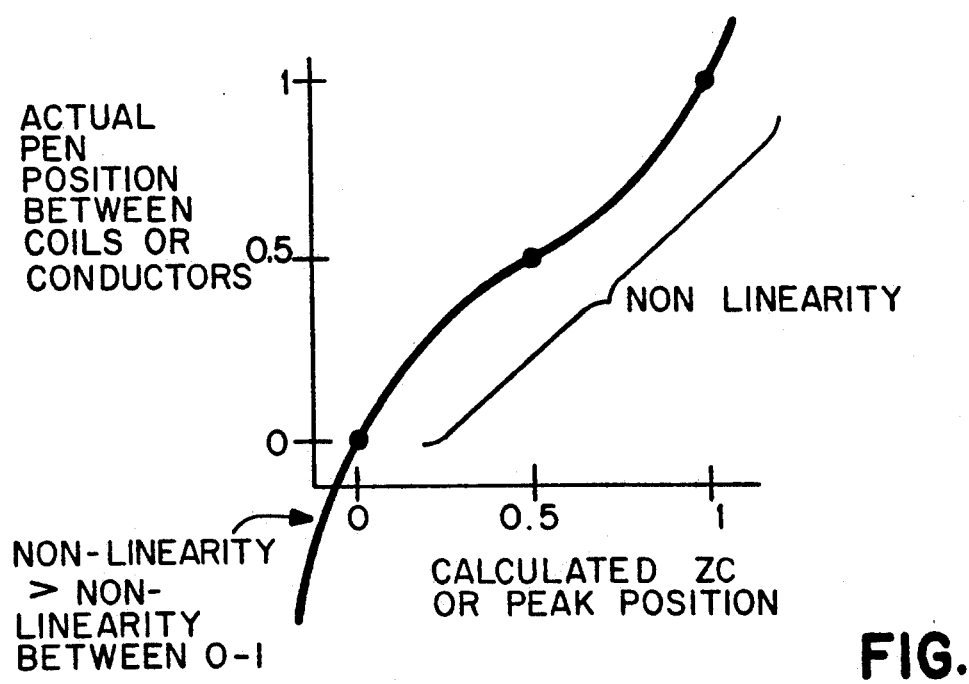
FIG. 8 is a graph that depicts an actual pen position and a corresponding non-linearity in an estimated pen position.

FIG. 8 is a graph that depicts an actual pen position versus an estimated pen position, and shows the non-linearity inherent between the points labeled (0, 0.5, and 1) for the three inductor geometries of FIG. 3.

The conditional inductor measurement method of the invention yields an optimal set of coil measurements, unless the actual pen position is more than one whole coil spacing away from the initial coil choice. For this case, the first and second coils do not enclose the actual pen position. In this case, which can be expected to occur only at high pen velocities and accelerations, the interpolated zero-crossing position estimate will be found to be to one side of the two measured coil pairs, but will often still be sufficiently accurate, after compensating for the non-linearities illustrated in FIG. 8. In contrast, a non-adaptive minimal scan will result in increased distortion whenever the pen is on the opposite side of the first coil from the expected position, and is thus not between the first and the second coil pairs, as expected. For example, and referring to FIG. 9(c), this condition would occur if the pen 16 was expected to be between coils H and I, but was actually to the left of coil H.

A further method of the invention employs the aforedescribed coil measurement determination in the context of a technique referred to as coordinate threading. In some EM tablet designs the analog electronics may be structured such that the measurement of the signal through a loop is not available until substantially after the end of the signal integration period. In these systems, it is useful to setup the next loop measurement cycle, i.e. choose the next loop to be measured, before the value is available from the last loop measurement. In this case, the conditional scanning method is used, without loss of time, by threading the x-axis and the y-axis coordinate scans.

Figure 6:
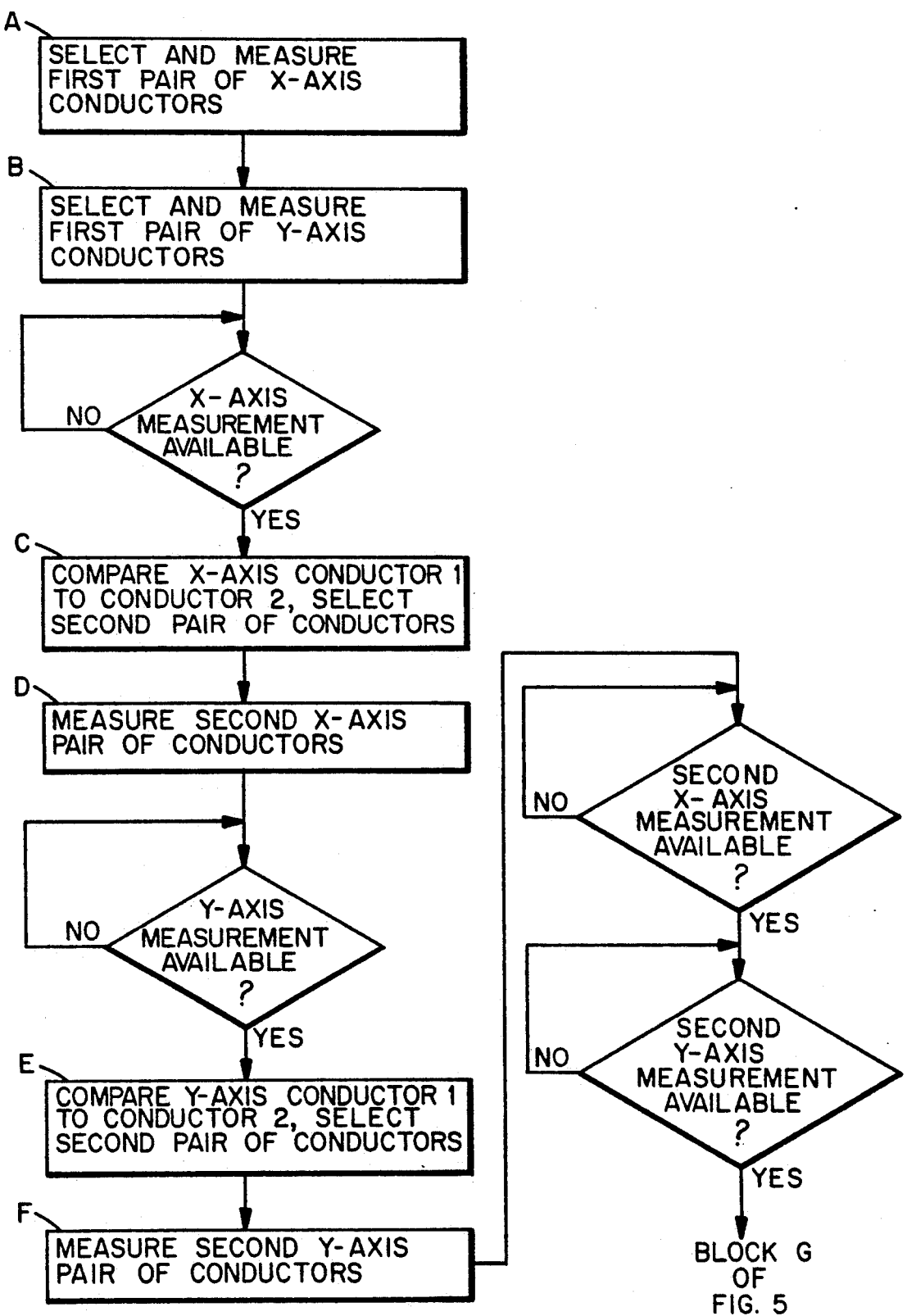
FIG. 6 is a flowchart illustrating a method of threading x-axis and y-axis measurements.

As is seen in the flowchart of FIG. 6, this is accomplished by measuring the first x-axis loop pair (Block A) and, while the analog signal is being digitized, the first y-axis loop pair is measured (Block B). When the x-axis gradient value is available, the second x-axis loop pair is selected in accordance with the methods described above (Block C), and is measured (Block D) while the first y-axis loop pair measurement is being digitized. After the first y-axis measurement is available, the next y-axis loop pair selection is made (Block E) and measured (Block F) while the second x-axis loop pair is being digitized. Thus, this method alternates between x-axis measurements and y-axis measurements.

Furthermore, if there are other measurements which can be made independently of the result of the first measurement, these measurement(s) may be made between the first and second loop pair measurements.

Figure 7:
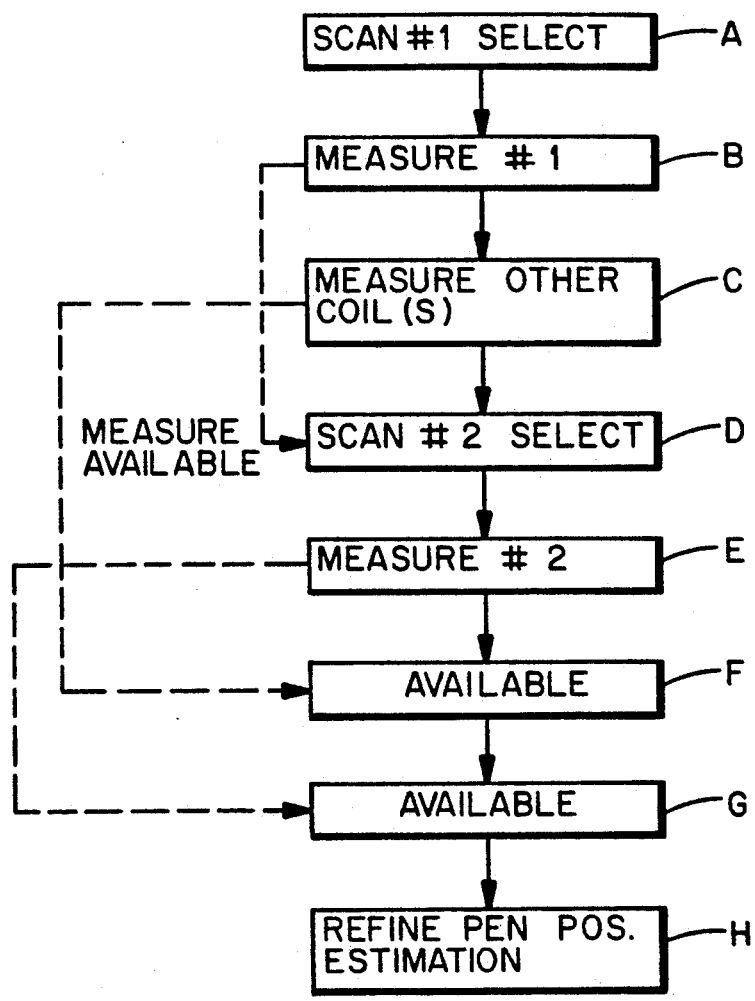
FIG. 7 is a flowchart illustrating a method of the invention wherein an additional coil is scanned before a comparison is completed.

As an example, the flowchart of FIG. 7 shows a case where a decision is made to scan a first coil pair (Block A), and at Block B the measurement is made. At Block C, and before the result of the measurement made at Block B is available, a further coil is measured which is known must be measured regardless of the outcome of the decision of the first measurement.

As an example, and using a pen estimation technique for coils labeled A, B, C, D, and E, a first measurement step measures the coil pair B and D, it being assumed that the pen is expected to be near to coil C. In accordance with this position estimation technique a next pair of coils will be either A and C, or C and E. That is, regardless of the outcome of the comparison between coils B and D, coil C will be included within the next measurement. As a result, at Block C coil C is measured.

At Block D the result of the measurement at Block B is available, and a decision is made as to which coil pair (A-C) or (C-E) is next to be measured, the decision being based on the measurement at Block B. At Block E only coil A or coil E is measured, in that the measurement of coil C has already been made at Block C. At Block F the result of the measurement at Block C is available. At Block G the result of the measurement at Block E is available, and at Block H the estimate of the position of the pen, along one axis, is determined based on the measurements made at Blocks B, C and E.

Although described in the context of an EM digitizing tablet, it should be appreciated that the teaching of the inventional also applies to electrostatic and electric field digitizing tablets wherein the signal is electrically induced on an array of conductors instead of inductive loops. Furthermore, although described in the context of a method that advantageously obtains a minimum required number of measurements to estimate the pen position, it should be realized that the method can also be employed to obtain additional measurements or pairs of measurements, over and above the minimum requirement, such as sidelobe measurements.

Thus, while the invention has bean particularly shown and described with respect to preferred embodiments thereof, it will be understood by those skilled in the art that changes in form and details may be made therein without departing from the scope and spirit of the invention.

Having thus described my invention, what I claim as new, and desire to secure by Letters Patent is:

1. A method of operating a position measuring device having a sensor grid that includes a first array of sensing elements, the first array being responsive to a moveable transmitter for having a detectable signal induced therein, comprising the steps of:
   determining an expected position of the transmitter relative to the first array of sensing elements;
   selecting, based on the expected position, a first sensing element and a second sensing element from the first array, the first and the second sensing elements being selected such that, based on the measurement of the first and the second sensing elements, one or more additional sensing elements may selected for further measurements;
   measuring the signal induced within the first and the second sensing elements;
   comparing the measured signal of the first sensing element to the measured signal of the second sensing element; and
   based on an outcome of the step of comparing, selecting one or more additional sensing elements from the first array to make a further measurement.

2. A method as set forth in claim 1 and further including the steps of:
   measuring the signal induced within the one or more additional sensing elements; and
   estimating a position of the transmitter, relative to the first array, based upon the signal measurements of the first, the second, and the one or more additional sensing elements.

3. A method as set forth in claim 2 wherein the sensor grid contains a second array of sensing elements, the second array being disposed at a predetermined orientation with respect to the first array, and further including the steps of:
   estimating a position of the transmitter relative to the second array of sensing elements;

selecting, based on the estimated position of the transmitter relative to the second array of sensing elements, a first sensing element and a second sensing element from the second array, the first and the second sensing elements of the second array being selected such that, based on the measurement of the first and the second sensing elements of the second array, one or more additional sensing elements of the second array may be selected for further measurements;

measuring the signal induced within the first and the second sensing elements of the second array;

comparing the measured signal of the first sensing element of the second array to the measured signal of the second sensing element of the second array;

based on an outcome of the step of comparing, selecting one or more additional sensing elements from the second array to make a further measurement;

measuring the signal induced within the one or more additional sensing elements of the second array; and estimating a position of the transmitter, relative to the second array, based upon the signal measurements of the first, the second, and the one or more additional sensing elements of the second array.

4. A method as set forth in claim 3 and further including a step of outputting the estimated positions.

5. A method as set forth in claim 2 wherein the first and the second sensing elements are selected to be on opposite sides of the expected position, and wherein the one or more additional sensing elements are selected to be adjacent to the first sensing element and to the second sensing element.

6. A method as set forth in claim 1 wherein each of the sensing elements includes an inductor that is inductively coupled to the transmitter.

7. A method as set forth in claim 3 wherein each of the sensing elements of the first array and the second array includes an inductor that is inductively coupled to the transmitter, and wherein the sensing elements of the first array are disposed orthogonally to the sensing elements of the second array.

8. A method as set forth in claim 6 wherein each of the sensing elements includes an inductive coil having a first end coupled to a common potential and a second end switchably coupled to measurement means.

9. A method of operating a sensor grid having a first array of inductors and a second array of inductors, the second array being disposed orthogonally to the first array, the first and the second arrays each being responsive to a moveable transmitter for having a detectable signal induced therein, comprising the steps of:

determining an expected position of the transmitter relative to a first one and to a second one of the arrays of inductors;

selecting at least one first inductor from the first array, the at least one first inductor being selected to be near to the expected position;

measuring the signal induced within the at least one first inductor of the first array;

during the step of measuring, selecting at least one first inductor from the second array, the at least one first inductor of the second array being selected to be near to the expected position;

measuring the signal induced within the at least one first inductor of the second array;

during the second step of measuring, examining the measured signal of the first inductor of the first array;

based on an outcome of the step of examining, selecting one or more additional inductors from the first array to make at least one further measurement so as to obtain a minimum required set of measurements to perform a transmitter position calculation; measuring the signal induced within the one or more additional inductors of the first array;

during the third step of measuring, examining the measured signal of the first inductor of the second array;

based on an outcome of the second step of examining, selecting one or more additional inductors from the second array to make at least one further measurement so as to obtain a minimum required set of measurements to perform a transmitter position calculation;

measuring the signal induced within the one or more additional inductors of the second array; and at the completion of the fourth step of measuring, estimating a position of the transmitter, relative to the first array and the second array, based upon the signal measurements of the selected inductors of first array and of the second array.

10. A method of operating a sensor grid having a first array of differentially connected coil pairs and a second array of differentially connected coil pairs, the second array being disposed at a predetermined orientation to the first array, the first and the second arrays each being inductively coupled to a moveable coil and responsive to the moveable coil for having a detectable signal induced therein, comprising the steps of:

determining an expected position of the moveable coil relative to a first one of the arrays of inductors;

selecting a first differentially connected coil pair from the first array, the first differentially connected coil pair being selected so as to encompass the expected position;

measuring the signal induced within the first differentially connect coil pair;

determining if the measured signal is positive or negative; and based on an outcome of the step of determining, selecting one or more additional differentially connected coil pairs to make further measurements.

11. A method as set forth in claim 10 and further including the steps of:

measuring the signal induced within the selected one or more additional differentially connected coil pairs; and estimating a position of the transmitter, relative to the first array, based upon the signal measurements of the first and the one or more additional differentially connected coil pairs.

12. A method as set forth in claim 11 and further including the steps of:

determining an expected position of the moveable coil relative to a second one of the arrays of inductors;

selecting a first differentially connected coil pair from the second array, the first differentially connected coil pair being selected so as to encompass the expected position;

measuring the signal induced within the first differentially connect coil pair of the second array;

determining if the measured signal is positive or negative;

based on an outcome of the step of determining, selecting one or more additional differentially connected coil pairs from the second array to make further measurements;

measuring the signal induced within the selected one or more additional differentially connected coil pairs of the second array; and estimating a position of the transmitter, relative to the second array, based upon the signal measurements of the first and the one or more additional differentially connected coil pairs of the second array.

13. An electromagnetic digitizer system comprising:

a sensor grid having a first array of inductors and a second array of inductors, the second array being disposed at a predetermined orientation to the first array, the first and the second arrays each being responsive to a moveable coil for having a detectable signal induced therein;

control means for interpolating a position of the moveable inductance relative to the first and the second arrays of inductors;

said control means including means for selecting a first inductor and a second inductor from the first array, the first and the second inductors being selected so that they are disposed on opposite sides of the interpolated position;

means, having an input coupled to the first array, for coupling the selected first and second inductors to an input of means for measuring the signal induced within the first and the second inductors; and means for comparing the measured signal of the first inductor to the measured signal of the second inductor;

wherein said control means is responsive to an output of said comparing means for selecting one or more additional inductors from the first array to make a further measurement.

14. A system as set forth in claim 13 wherein said coupling means is further operable to couple said measuring means to one or more additional inductors for measuring the signal induced therein; and wherein said control means includes means for interpolating a position of the moveable coil, relative to the first array, based upon the signal measurements of the first, the second, and the one or more additional inductors.

15. A system as set forth in claim 14 wherein the one or more additional inductors are selected to be third and fourth inductors that are disposed adjacent to the first inductor and the second inductor, respectively.

16. A system as set forth in claim 13 wherein each of the inductors includes an inductive coil having a first end coupled to a common potential and a second end switchably coupled to said measuring means, and wherein the inductive coils of the first array are disposed orthogonally to the inductive coils of the second array.

17. A method of operating a sensor grid having a first array of inductors and a second array of inductors, the second array being disposed at a predetermined orientation to the first array, the first and the second arrays each being responsive to a moveable transmitter for having a detectable signal induced therein, comprising the steps of:

estimating an expected position of the transmitter relative to a first one of the arrays of inductors;

selecting at least one inductor from the first array so as to refine the estimate of the expected position, the at least one selected inductor being disposed near to the expected position;

measuring the signal induced within the at least one selected inductor;

before the result of the measurement is available, selecting and measuring at least one additional inductor from the first array or from the second array;

when the measurement of the signal induced within the at least one selected inductor is available, examining the measured signal;

based on an outcome of the step of examining, selecting at least one further inductor from the first array to make a further measurement; and estimating the actual position based on the measurement of the at least one selected inductor and the at least one further inductor.

18. A method as set forth in claim 17 wherein the at least one additional inductor is an inductor that is required to be measured regardless of an outcome of the measurement of the at least one selected inductor, and wherein the step of estimating the actual position also employs the measurement of the at least one additional inductor.

19. A method of operating a digitizer system of a type having an array of inductors responsive to a position of a moveable field generating means, means for measuring a signal induced into any one of the inductors by the field generating means, means for controlling selection of inductors for measurement, and means for computing an interpolated position of the field generating means based on measurements made of a plurality of the inductors, comprising the steps of:

determining an expected position of the field generating means relative to the array of inductors; selecting a pair of inductors that are located relative to the expected position such that a signal induced into one of the inductors, due to a difference between an actual position of the field generating means and the expected position, will be greater than or less than a signal induced into the other one of the inductors;

measuring the signals induced into the inductors of the pair of inductors;

based on the measurement, determining any additional inductors from which measurements are required to compute the actual position of the field generating means;

measuring the signals induced into the determined ones of the additional inductors; and determining and reporting the actual position of the field generating means based on the results of the first and the second steps of measuring.

20. A method as set forth in claim 19 wherein the pair of inductors are two inductors that are required to be measured for the computation of the actual position of the field generating means.

21. A method as set forth in claim 19 wherein the pair of inductors and the additional inductors include all inductors from the array that are required to compute the actual position of the field generating means relative to the array, and includes no inductors that are not required to compute the actual position of the field generating means relative to the array.

22. A method of operating a digitizer system of a type having an array of inductors responsive to a position of a moveable field generating means, means for measuring both a signal magnitude and signal polarity induced into any one of the inductors by the field generating means, means for controlling selection of inductors for measurement, and means for computing an interpolated position of the field generating means based on measurements made of a plurality of the inductors, comprising the steps of:

determining an expected position of the field generating means relative to the array of inductors;

selecting a first inductor that is located relative to the expected position such that a polarity of a signal induced into the first inductor, due to a difference between an actual position of the field generating means and the expected position, may be positive or negative;

measuring the signal magnitude and polarity induced into the first inductor; based on the measurement, determining any additional inductors from which measurements are required to compute the actual position of the field generating means;

measuring the signals induced into the determined ones of the additional inductors; and computing and reporting the actual position of the field generating means based on the results of the first and the second steps of measuring.

23. A method of operating a digitizer device, said device comprising an array of sensing elements responsive to a position of a transmitting element, comprising the steps of:

determining an expected position of the transmitting element relative to the array of sensing elements;

based on the expected position, selecting a first group comprised of one or more sensing elements for making an initial measurement, from which additional sensing elements for measurement are selected; measuring a signal from the first group of sensing elements;

based on a result of the step of measuring, determining one or more additional sensing elements from which measurements are required to determine an actual position of the transmitting element;

measuring a signal from the one or more additional sensing elements; and estimating the actual position of the transmitting element relative to the array of sensing elements based on the results of the first and the second steps of measuring.

24. A method as set forth in claim 23 wherein the first group of sensing elements and the one or more additional sensing elements include all sensing elements from the array that are required to estimate the actual position of the transmitting element relative to the array, and includes no sensing elements that are not required to estimate the actual position of the transmitting element relative to the array.

25. A method as set forth in claim 23 wherein each of the sensing elements is an inductor.

26. A digitizer device comprising:

an array of sensing elements responsive to a position of a transmitting element;

means, having an input coupled to an output of said array, for determining an expected position of the transmitting element relative to the array of sensing elements;

means, responsive to the expected position, for selecting a first group comprised of one or more sensing elements for making an initial measurement; and means for measuring the signals from the first group of sensing elements; wherein said selecting means is responsive to the operation of said measuring means for selecting one or more additional sensing elements that are required to be measured to determine an actual position of the transmitting element; wherein said measuring means measures the one or more additional sensing elements; and further including means for estimating the actual position of the transmitting element relative to the array of sensing elements based on the results of the measuring means measuring the first group of sensing elements and the one or more additional sensing elements.

27. A digitizer device as set forth in claim 26 wherein the first group of sensing elements and the one or more additional sensing elements include all sensing elements from the array that are required to estimate the actual position of the transmitting element relative to the array, and includes no sensing elements that are not required to estimate the actual position of the transmitting element relative to the array.

28. A digitizer device as set forth in claim 26 wherein each of the sensing elements is an inductor.

29. A method as set forth in claim 2 wherein the sensor grid contains a second array of sensing elements, the second array being disposed at a predetermined orientation with respect to the first array, and further including the steps of:

determining an expected position of the transmitter relative to the second array of sensing elements;

selecting, based on the expected position of the transmitter relative to the second array of sensing elements, a first sensing element and a second sensing element from the second array, the first and the second sensing elements of the second array being selected such that, based on the measurement of the first and the second sensing elements of the second array, one or more additional sensing elements of the second array may be selected for further measurements;

measuring the signal induced within the first and the second sensing elements of the second array;

comparing the measured signal of the first sensing element of the second array to the measured signal of the second sensing element of the second array;

based on an outcome of the step of comparing, selecting one or more additional sensing elements from the second array to make a further measurement;

measuring the signal induced within the one or more additional sensing elements of the second array; and estimating a position of the transmitter, relative to the second array, based upon the signal measurements of the first, the second, and the one or more additional sensing elements of the second array.

* * * * *